(12) United States Patent
Ranke et al.

(10) Patent No.: US 9,374,702 B2
(45) Date of Patent: Jun. 21, 2016

(54) TECHNIQUE FOR OPERATING A NETWORK NODE DURING A MOBILE TERMINATING ROAMING FORWARDING PROCEDURE

(75) Inventors: Karl-Peter Ranke, Herzogenrath (DE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 6 days.

(21) Appl. No.: 14/423,407

(22) PCT Filed: Aug. 24, 2012

(86) PCT No.: PCT/EP2012/003589
§ 371 (c)(1),
(2), (4) Date: Feb. 23, 2015

(87) PCT Pub. No.: WO2014/029409
PCT Pub. Date: Feb. 27, 2014

(65) Prior Publication Data
US 2015/0215771 A1    Jul. 30, 2015

(51) Int. Cl.
*H04W 8/20* (2009.01)
*H04W 8/12* (2009.01)
*H04W 36/32* (2009.01)
*H04W 60/04* (2009.01)

(52) U.S. Cl.
CPC ....... *H04W 8/20* (2013.01); *H04W 8/12* (2013.01); *H04W 36/32* (2013.01); *H04W 60/04* (2013.01)

(58) Field of Classification Search
CPC ......... H04W 8/20; H04W 36/32; H04W 8/12; H04W 60/04
See application file for complete search history.

(56) References Cited

U.S. PATENT DOCUMENTS

| 6,477,375 | B1 * | 11/2002 | Ho | H04W 8/04 455/433 |
| 6,741,849 | B1 * | 5/2004 | Verkama | H04M 3/54 379/114.01 |
| 2010/0190492 | A1 * | 7/2010 | Jiang | H04M 15/55 455/432.1 |
| 2010/0330960 | A1 * | 12/2010 | Ravishankar | H04M 3/2281 455/410 |

(Continued)

FOREIGN PATENT DOCUMENTS

| EP | 2 285 157 A1 | 2/2011 |
| WO | WO 2008/033951 A2 | 3/2008 |
| WO | WO 2012/099865 A1 | 7/2012 |

OTHER PUBLICATIONS

International Search Report, PCT International Application No. PCT/EP2012/003589, May 15, 2013.

(Continued)

*Primary Examiner* — Nathan Mitchell
(74) *Attorney, Agent, or Firm* — Myers Bigel & Sibley, P.A.

(57) ABSTRACT

A technique for operating a network node during a Mobile Terminating Roaming Forwarding (MTRF) procedure is described. The MTRF procedure involves a first MSC paging a Mobile Subscriber (MS) and a second MSC where the MS is performing a location update. A method implementation of the technique performed by the first MSC includes receiving an information request message, receiving from the second MSC, a Mobile Subscriber Roaming Number (MSRN) associated with the call to the MS, and sending, in response to the information request message, the MSRN towards a Gateway MSC.

22 Claims, 7 Drawing Sheets

(56) References Cited

U.S. PATENT DOCUMENTS

| | | | |
|---|---|---|---|
| 2011/0081907 A1* | 4/2011 | Yang | H04W 8/12 455/433 |
| 2011/0306331 A1 | 12/2011 | Gupta et al. | |
| 2012/0190351 A1* | 7/2012 | Tian | H04W 8/12 455/417 |
| 2013/0237213 A1* | 9/2013 | Tian | H04W 36/0022 455/432.1 |
| 2014/0099944 A1* | 4/2014 | Zisimopoulos | H04W 88/06 455/426.1 |

OTHER PUBLICATIONS

3GPP, Technical Specification, "3rd Generation Partnership Project; Technical Specification Group Core Network and Terminals; Basic call handling; Technical realization (Release 11)", 3GPP TS 23.018 V11.3.0 (Jun. 2012), 298 pp.

3GPP, Technical Specification, "3rd Generation Partnership Project; Technical Specification Group Services and System Aspects; Circuit Switched (CS) fallback in Evolved Packet System (EPS) (Release 11)", 3GPP TS 23.272 V11.3.0 (Dec. 2012), 91 pp.

3GPP, Technical Specification, "3rd Generation Partnership Project; Technical Specification Group Core Network and Terminals; Mobile Application Part (MAP) specification (Release 11)", 3GPP TS 29.002 V11.3.0 (Jun. 2012), 993 pp.

Written Opinion of the International Searching Authority, PCT International Application No. PCT/EP2012/003589, May 15, 2013, 4 pages.

3GPP, Technical Specification, "3rd Generation Partnership Project; Technical Specification Group Services and System Aspects; Telecommunication management; Charging management; Circuit Switched (CS) domain charging (Release 10)", 3GPP TS 32.250 V10.4.0 (Mar. 2012), 112 pp.

Alcatel-Lucent "Correction on Charging for Mobile Termination Roaming Forwarding (MTRF)—alignment with TS 23.018" 3GPP TSG-SA5 (Telecom Management) SA5#81, Feb. 6-10, 2012; Dresden, Germany; S5-120236; Change Request 32.250 CR 0025 rev 1 Current version 10.3.0; 10 pp. Downloaded from the internet: http://www.3gpp.org/ftp/tsg_sa/TSG_SA/TSGS_55/docs/SP-120050.zip.

* cited by examiner

TECHNIQUE FOR OPERATING A NETWORK NODE DURING A MOBILE TERMINATING ROAMING FORWARDING PROCEDURE

CROSS REFERENCE TO RELATED APPLICATION

This application is a 35 U.S.C. §371 national stage application of PCT International Application No. PCT/EP2012/003589, filed on 24 Aug. 2012, the disclosure and content of which is incorporated by reference herein in its entirety. The above-referenced PCT International Application was published in the English language as International Publication No. WO 2014/029409 A1 on 27 Feb. 2014.

TECHNICAL FIELD

The present disclosure generally relates to Mobile Terminating Roaming Forwarding (MTRF) procedures. In particular, a technique for operating a network node such as a Mobile Switching Center (MSC) or a Gateway MSC (GMSC) during an MTRF procedure is described. The technique may be implemented as a method, a computer program product, a network node or a network system.

BACKGROUND $3^{rd}$ Generation Partnership Project (3GPP) Technical Specification (TS) 23.018 (see, e.g., V11.3.0 of June 2012) describes basic call handling mechanisms. Those call handling mechanisms concern, inter alia, terminating calls directed to Mobile Subscribers (MSs) in a $2^{nd}$ or $3^{rd}$ Generation (2G or 3G) communications system such as a Universal Mobile Telecommunications System (UMTS) or a Global System for Mobile Communications (GSM).

An exemplary call handling mechanism for a call originating at a so-called A subscriber and terminating at a roaming MS (also called B subscriber) is shown in FIG. 1 (see section 4.2 of 3GPP TS 23.018). In the scenario illustrated in FIG. 1 the roaming MS is located in a Visited Public Land Mobile Network (VPLMNB).

When a GMSC of the called B subscriber (GMSCB) receives an ISDN User Part (ISUP) Initial Address Message (IAM), it requests routing information from the associated Home Location Register of the B subscriber (NLRB, or simply HLR). To this end, a Send Routing Info (SRI) message is sent to the HLR. Next, the HLR requests a roaming number (i.e., a Mobile Subscriber Roaming Number, MSRN) from the Visitor Location Register currently associated with the B subscriber (VLRB, or simply VLR). In this regard, a Provide Roaming Number (PRN) message is transmitted to the VLR. In a further step the VLR returns the MSRN in a PRN ACK message to the HLR, which forwards the MSRN to the GMSC in an SRI ACK message. The GMSC uses the MSRN to construct an ISUP IAM, which is sent to the Visited MSC of the B subscriber (VMSCB, or simply VMSC).

Upon receipt of the IAM from the GMSC, the VMSC requests information to handle the incoming call from its associated VLR. If the VLR determines that the incoming call is allowed, it requests the VMSC to page the MS. In a next step, the VMSC pages the MS via a Base Station Subsystem associated with the B subscriber (BSSB) using radio interface signalling. In this context, the VMSC starts a local paging timer. When the MS responds, the VMSC informs the VLR in a Page ACK message thereof and stops the paging timer.

Next, the VLR instructs the VMSC to connect the call in a Complete Call message, and the VMSC finally establishes a traffic channel to the MS.

The mechanism for handling a terminating call illustrated in FIG. 1 needs to be modified in certain cases, such as Circuit Switched Fallback (CSFB) scenarios. CSFB from Long Term Evolution (LTE) access is specified today in 3GPP TS 23.272.

In brief, CSFB permits in an Evolved Packet System (EPS) the provisioning of voice and other CS domain services (such as services pertaining to Unstructured Supplementary Service Data, or USSD) by re-use of CS infrastructure when the MS (referred to as UE in TS 23.272) is served by the Evolved UMTS Terrestrial Radio Access Network (E-UTRAN). A CSFB-enabled MS, connected to E-UTRAN, may thus use $2^{nd}$ or $3^{rd}$ Generation (2G or 3G) technologies such as GSM Edge RAN (GERAN) or UTRAN to connect to the CS domain.

FIG. 2 illustrates an exemplary scenario in which a CSFB-enabled MS connected to E-UTRAN (via an LTE-Uu interface) uses GERAN (via a Um interface) or UTRAN (via a Uu interface) to connect to the CS domain in a CSFB situation (see section 4 of 3GPP TS 23.272). CSFB signalling is realized via an SGs interface between a Mobility Management Entity (MME) associated with the MS and a Mobile Switching Centre Server (MSC-S). The MSC-S has to be CSFB-enabled, which basically means that the MSC-S will have to be capable of maintaining SGs associations towards the MME for EPS-attached MSs. A Serving GPRS Support Node (SGSN) is coupled via an S3 interface to the MME and via an optional Gs interface to the MSC-S (not needed for CSFB).

The SGs interface to the MSC-S is used for mobility management and paging procedures between EPS and the CS domain. CSFB is triggered by paging in E-UTRAN and may leads to a Location Update with respect to GERAN or UTRAN (see FIG. 2) in case the MS has changed the Location Area (LA) during CSFB.

CSFB and other roaming services are only available in case E-UTRAN coverage (as defined by Tracking Areas, or TAs) is overlapped by either GERAN or UTRAN coverage (as defined by, for example LAs). A general problem results from the fact that there exists no 1:1 mapping between TAs and LAs.

As shown in FIG. 3, for a terminating call the lacking congruency between TAs and LAs may have the consequence that the MS, when roaming and in particular when falling back from E-UTRAN to GERAN or UTRAN, may land in a LA that is not controlled by the "old" MSC towards which the SGs interface association for the MS has been established by the MME. In such a case the "old" MSC will not be able to terminate the call. For this and other reasons, so-called Mobile Terminating Roaming Retry (MTRR) and Mobile Terminating Roaming Forwarding (MTRF) procedures are defined in Section 5.2 of 3GPP TS 23.018 (see in particular Section 5.2.3) to allow that call termination is tried again towards the "new" MSC controlling the cell the MS is presently camping on. The new MSC will assign a "new" MSRN to the MS that is different from the "old" MSRN assigned by the old MSC.

SUMMARY

In general, there is a need for enhancing the processing capabilities of the GMSC.

According to one aspect, a method of operating a first MSC during an MTRF procedure for a call to an MS is provided, wherein the MTRF procedure involves the first MSC paging the MS and a second MSC where the MS is performing a location update. The method comprises the steps of receiving an information request message, receiving, from the second MSC, an MSRN associated with the call to the MS, and sending, in response to the information request message, the MSRN towards a GMSC.

The information request message may be generated by the GMSC or an HLR. In one implementation, the information request message is a dedicated new message. In another implementation the information request message is an existing message. The existing message may optionally be extended by an indicator to signal that the GMSC requests an item of information. As an example, such an existing message may be an SRI message that optionally comprises an indicator indicative of an information request by the GMSC. Moreover, the existing message may be a PRN message that optionally comprises such an indicator. The indicator may be omitted in cases in which the first MSC is configured to always send the MSRF towards the GMSC in an MTRS procedure (involving, for example, the SRI message and/or PRN message).

The information request message may be received by the first MSC from an HLR. As an example, the GMSC may have sent the information request message to the HLR for forwarding it to the first MSC or for triggering transmission of another type of information request message to the first MSC. In an alternative implementation, the information request message may be sent directly from the GMSC to the first MSC.

The GMSC may use the MSRN for various purposes, including compiling statistics, lawful interception in the home network of the called MS, accounting or charging. In an exemplary charging scenario, the information request message may thus comprise an MTRF charging indicator. In other scenarios, additional or alternative indicators may be used. As stated above, the information request message may also be unspecific, meaning that it only triggers the transmission of the MSRN towards the GMSC without specifically indicating a particular use of the MSRN by the GMSC.

In one implementation, the method further comprises sending an MSC number associated with the second MSC towards the GMSC. The sending step may be performed in response to the information request message. The MSC number associated with the second MSC may be received by the first MSC from the second MSC. The MSC number may be sent towards to the GMSC together with the MSRN or in a separate message.

According to a first variant, the MSRN is sent towards the GMSC in one of an Address Complete Message (ACM), Answer Message (ANM), Connect (CON) message, Call Progress (CPG) message, Session Initiation Protocol (SIP) Provisional Response and SIP Final Response. According to another variant, the MSRN is sent towards the GMSC in a dedicated Mobile Application Part (MAP) procedure. There may be other variants for sending the MSRN towards the GMSC.

The information request message may comprise at least one of an address of the GMSC and a call reference number. The call reference number may be sent (back) to the GMSC by the first MSC. As an example, the call reference number may be returned together with the MSRN, and, optionally, the MSC number associated with the second MSC (e.g., in a single message).

According to a further aspect, a method of operating a GMSC during an MTRF procedure for an MS is provided, wherein the MTRF procedure involves a first MSC paging the MS and a second MSC where the MS is performing a location update. The method comprises sending an information request message towards the first MSC and receiving, from the first MSC and in response to the information request message, an MSRN assigned by the second MSC and associated with the call to the MS.

The method may further comprise adding the MSRN to a call record (that may be associated with the call and/or the MS). As indicated above, the MSRN may be exploited by the GMSC for various purposes. So if, for example, the information request message comprises an MTRF charging indicator, the MSRN may be added to a charging record of the call. In other implementations, the MSRN may be added to other records and/or used for other purposes (e.g., compiling statistics or lawful interception).

The method may further comprise receiving an MSC number associated with the second MSC. The MSC number may also be added to the call record. The MSC number may be exploited in connection with charging the MS for the MTRF call. In another variant, the MSC number may be used for collecting statistics (e.g., as to the MSCs involved in MTRF procedures).

The information request message may be sent towards a HLR. As stated above, the HLR may forward the information request message towards the first MSC. The HLR may transform the type of information request message received from the GMSC to another type of information request message before forwarding it to the first MSC. This other type of information request message may again be a dedicated new message or, alternatively, an existing message. As an example, the HLR may transform SRI message received from the GMSC into a PRN message before forwarding it to the first MSC.

The information request message may comprise an address of the GMSC. Additionally, or as an alternative, the information request messages may comprise a call reference number. The MSRN assigned by the second MSC may be received together with the call reference number. In such a case, the MSRN may be added to the call record identified by the call reference number.

The technique presented herein may be realized in the form of software, in the form of hardware, or using a combined software/hardware approach. As regards a software aspect, a computer program product comprising program code portions for performing the steps presented herein when the computer program product is executed on at least one computing device is provided. The computer program product may be stored on a computer-readable recording medium such as a memory chip, a CD-ROM, a hard disk, and so on. Moreover, the computer program product may be provided for download via a network connection onto such a recording medium.

Further provided is an MSC for participating in an MTRF procedure for a call to an MS, wherein the MTRF procedure involves the MSC paging the MS and another MSC where the MS is performing a location update. The MSC comprises a first interface adapted to receive an information request message, a second interface adapted to receive, from the second MSC, an MSRN associated with the call to the MS, and a third interface adapted to send, in response to the information request message, the MSRN towards a GMSC.

Two or all of the first, second and third interface may be combined into a single interface. One, two or all of the first, the second and the third interface may take the form of an MAP interface.

According to a further aspect, a GMSC for participating in an MTRF procedure for a call to an MS is provided, wherein the MTRF procedure involves a first MSC paging the MS and a second MSC where the MS is performing a location update. The GMSC comprises a first interface adapted to send an information request message towards the first MSC, and a second interface adapted to receive, from the first MSC and in response to the information request message, an MSRN assigned by the second MSC and associated with the call to the MS.

The first and the second interface may be integrated into a single interface. One or both of the first and a second interface may be an MAP interface.

Further, a communication system comprising the MSC and the GMSC as presented herein is provided. The communication system may comprise one or more further network components, such as the other MSC, an HLR, the MS and so on.

BRIEF DESCRIPTION OF THE DRAWINGS

Further aspects, details and advantages of the technique presented herein will become apparent from the following description of exemplary embodiments in conjunction with the drawings, wherein:

FIG. 8 illustrates a still further method embodiment in the form of a signalling diagram for an MTRF procedure.

DETAILED DESCRIPTION

In the following description of exemplary embodiments, for purposes of explanation and not limitation, specific details are set forth such as specific sequences of signalling steps in order to provide a thorough understanding of the technique presented herein. It will be apparent to one skilled in the art that the technique may be practised in other embodiments that depart from these specific details.

Moreover, those skilled in the art will appreciate that the services, functions and steps explained herein below may be implemented using software functioning in conjunction with a programmed micro processor, an Application Specific Integrated Circuit (ASIC), a Digital Signal Processor (DSP) or a general purposes computer. It will also be appreciated that while the following embodiments will primarily be described in the context of methods and devices, the technique presented herein may also be embodied in a computer program product as well as in a system comprising a computer processor and a memory coupled to the processor, wherein the memory is encoded with one or more programs that may be perform the services, functions and steps disclosed herein.

The technique presented herein is generally directed to performing an enhanced MTRF procedure for a terminating call to an MS. Accordingly, it will typically involve one or more of the network nodes schematically illustrated in FIGS. 1 and 2. While in the call terminating procedure discussed above with reference to FIG. 1 the GMSC receives the old MSRN, no need has been seen thus far to also communicate the new MSRN to the GMSC. It has been found that in many cases the GMSC could benefit from being informed about the new MSRN also, and that the processing capabilities of the GMSC might thus be enhanced.

Figure 1:
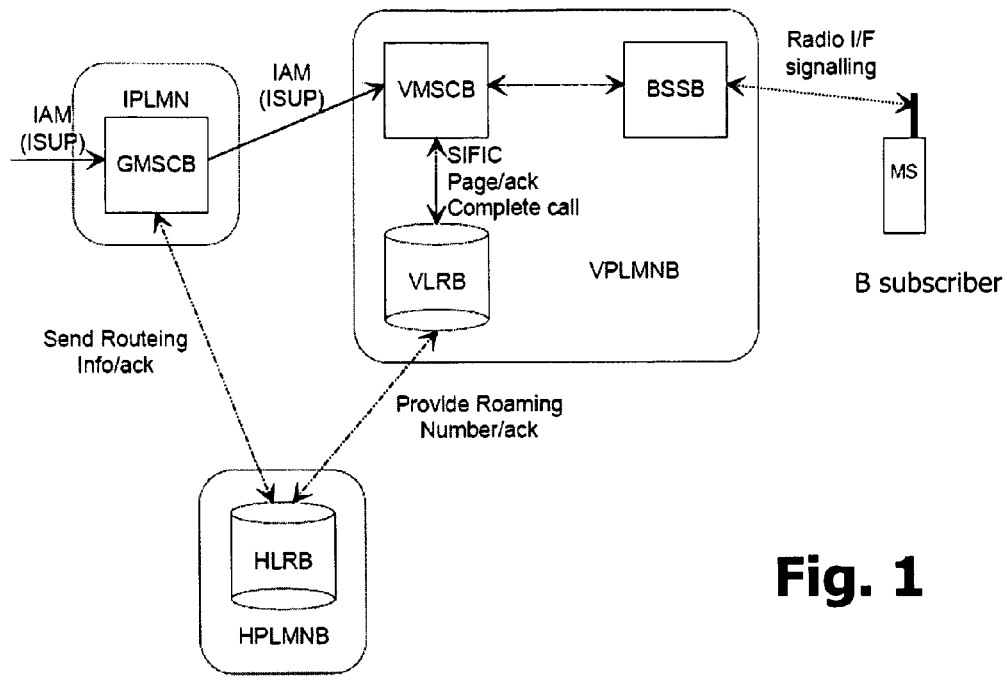
FIG. 1 illustrates a basic call handling mechanism for a terminating call.
Figure 2:
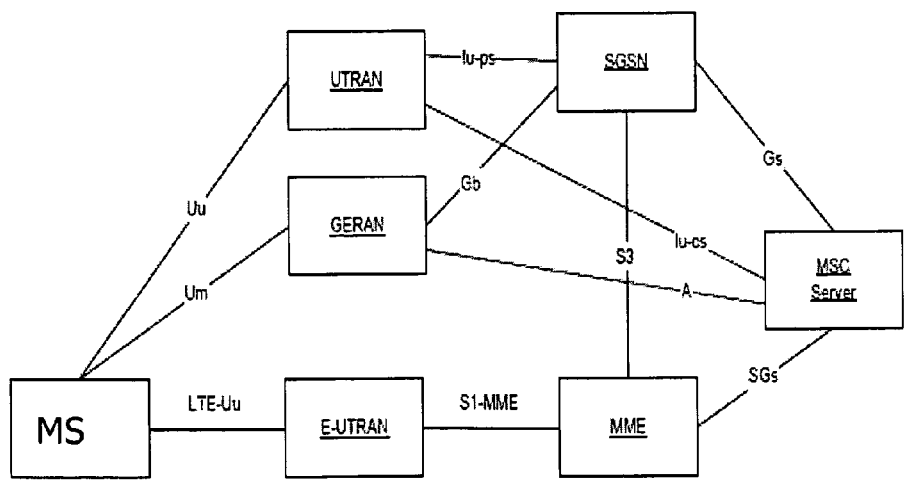
FIG. 2 illustrates the components involved in a CSFB situation.
Figure 3:
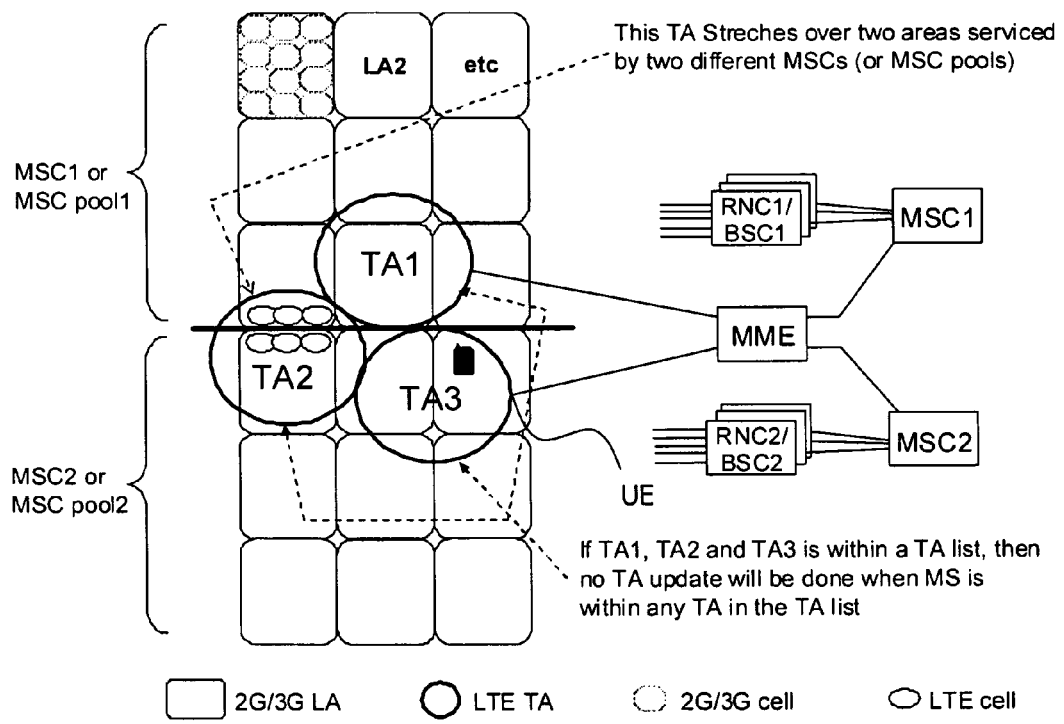
FIG. 3 illustrates lacking congruency between Tracking Areas on the one hand and Location Areas on the other.
Figure 4A:
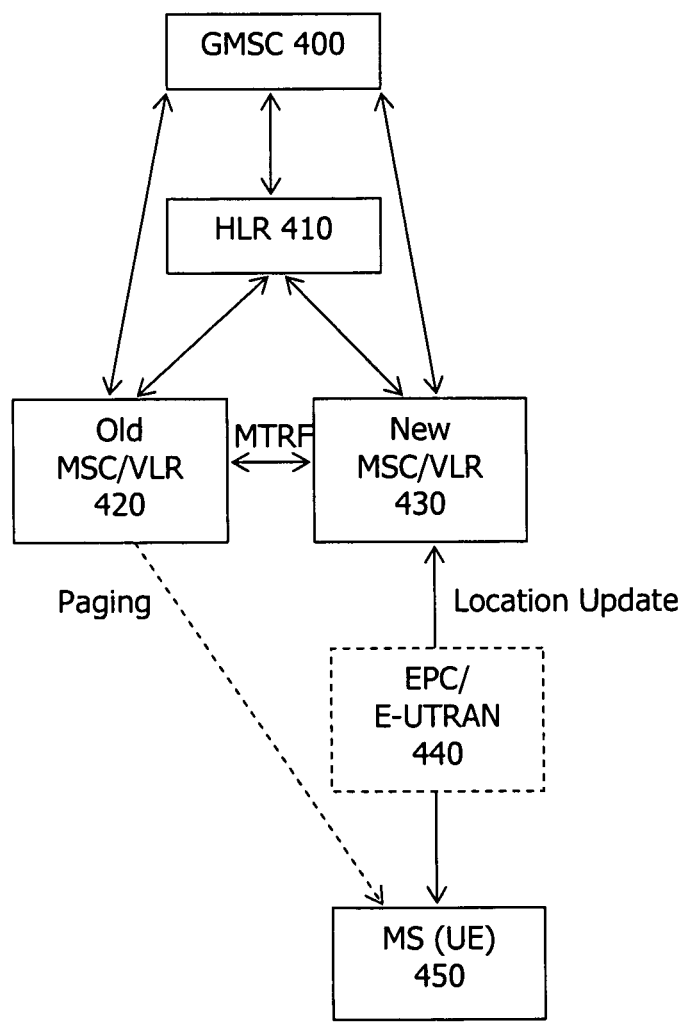
FIGS. 4A, 4B illustrate network components potentially involved in method embodiments as well as MSC and GMSC embodiments.

Specifically, referring to the diagram of FIG. 4A, a typical network environment in which the enhanced MTRF procedure can be practised may comprise a GMSC 400, an HLR 410, a first MSC or MSC-S 420 (simply "MSC" hereinafter, optionally with an associated VLR as shown in FIG. 1), a second MSC or MSC-S 430 (simply "MSC" hereinafter, optionally with an associated VLR as shown in FIG. 1) and at least one MS 450. In some realizations, one or both of the first MSC 420 and the second MSC 430 may be an MSC combined with a Media Gateway (MGW). Optionally, for example in a CSFB scenario, an Evolved Packet Core (EPC)/E-UTRAN 450 may functionally be arranged between the MSC 420 and the MS 450. The MSC 430 may be connected to the MS 450 via GERAN or UTRAN.

The first MSC 420 will in the following be called "old" MSC 420 as it is the MSC where the MS 450 was initially registered and that pages the MS 450. The second MSC 430 will in the following be referred to as the "new" MSC 430 as it is the MSC where the UE 450 is performing Location Update (e.g., after CSFB).

Figure 4B:
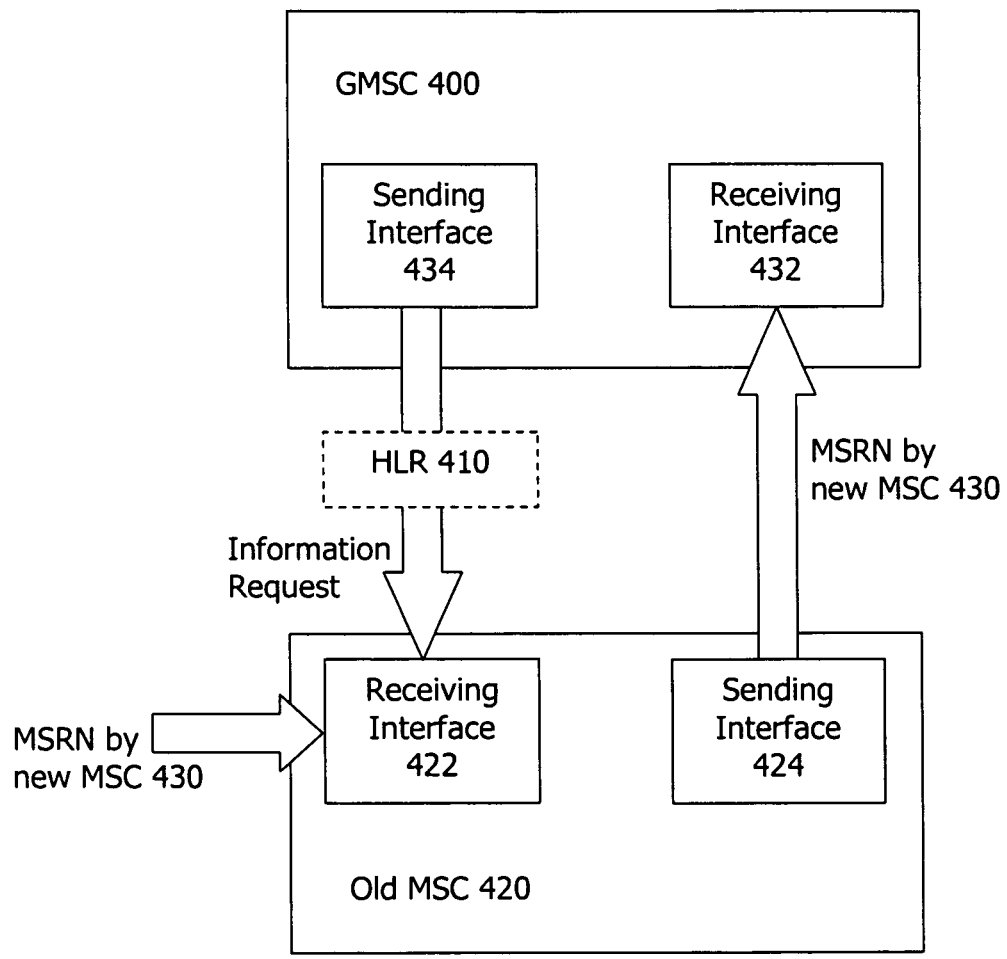

FIG. 4B illustrates the core components of the old MSC 420 as well as of the GMSC 400.

As shown in FIG. 4B, the old MSC 420 comprises a receiving interface 422 as well as a sending interface 424 (e.g., realized as MAP interfaces). The receiving interface 422 is adapted to receive an information request message generated by the GMSC 400. The receiving interface 422 is further adapted to receive, from the new MSC 430, an MSRN associated with the call to the MS 450. The MSRN may have been assigned by the new MSC 430. The sending interface 424 is adapted to send, in response to the information request message, the MSRN towards the GMSC 400.

It should be noted that the receiving interface 422 could in one implementation be constituted by two dedicated interfaces, namely a first receiving interface adapted to receive the information request message and a second receiving interface adapted to receive, from the new MSC 430, the MSRN associated with the MS 450.

As shown in FIG. 4B, the GMSC 400 likewise comprises a receiving interface 432 as well as sending interface 434 (e.g., realized as MAP interfaces). The receiving interface 432 is adapted to receive, from the old MSC 420, the MSRN assigned by the new MSC 430 and associated with the call to the MS 450. The MSRN is received in response to the information request message that has previously been sent, via the sending interface 434, towards the old MSC 420 (e.g., via the HLR 410 or directly).

Figure 5:
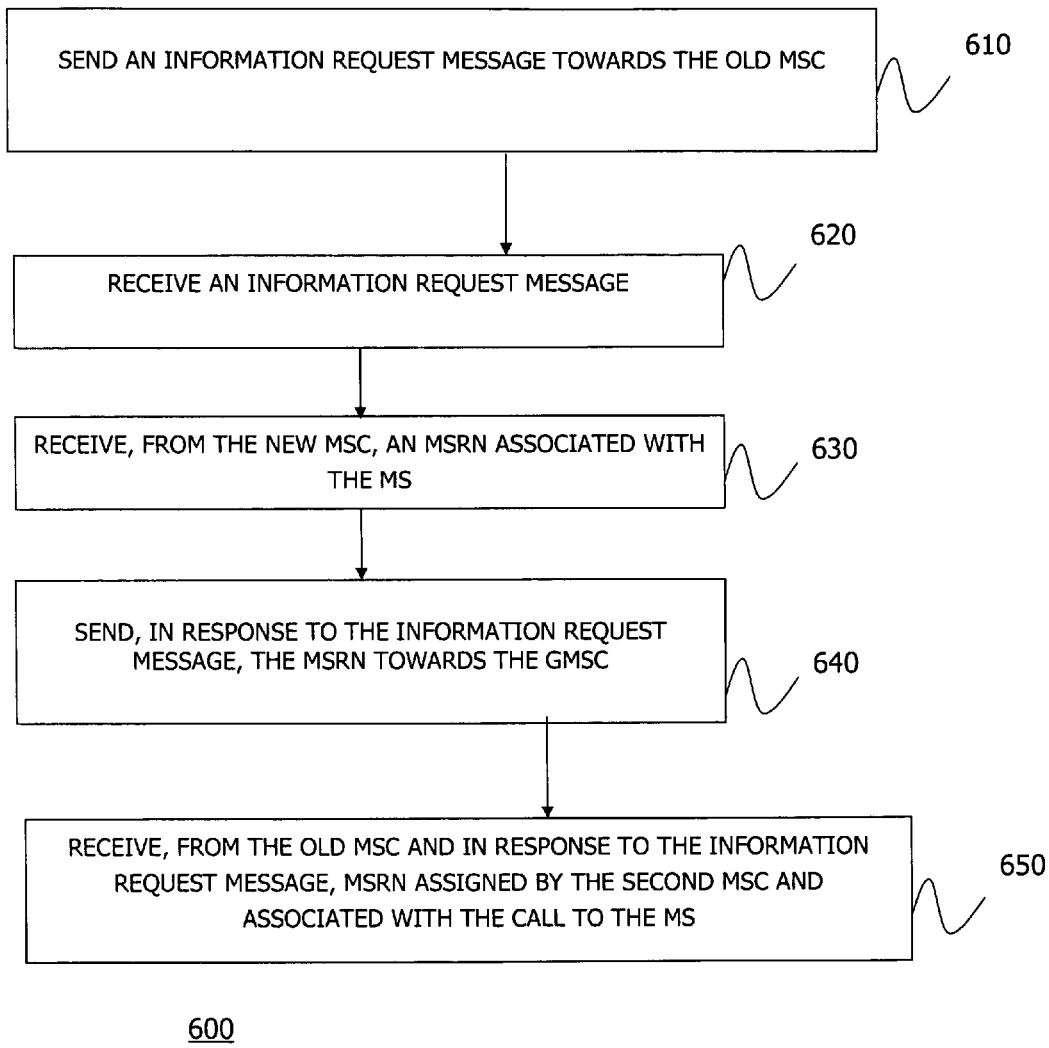

Accordingly, and now referring to the flow diagram 500 of FIG. 5 which illustrates methods of operating the old MSC 420 and the GMSC 400, the GMSC 400 may in an initial step 610 send an information request message towards the old MSC 420 via its sending interface 434. The old MSC 420 receives that information request message either directly from the GMSC 400 or via the HLR 410 at its receiving interface 422 (step 620). At an earlier or later point in time, the old MSC 420 also receives the MSRN associated with the MS 450 from the new MSC 430, as illustrated in step 630. The information request received with associated message in step 620 triggers forwarding of the MSRN (received from the new MSC 430 in step 630) towards the GMSC 400 in step 640. Then, in step 650, the GMSC receives, from the old MSC 420, that MSRN assigned by the new MSC 430 via its receiving interface 432.

In optional further steps, the GMSC 400 upon receipt of the MSRN in step 650 may add the MSRN to a local call record.

As an example, the MSRN may be added to a charging record for the terminating call to the MS 450. In such a charging scenario, the information request message sent in step 610 towards the old MSC 420 may have comprised a dedicated MTRF charging indicator. Such a dedicated charging indicator is useful in case the information request message is an existing message that is already sent in conventional MTRF procedures towards the old MSC 420 (e.g., an SRI or PRN message). In case the information request message is realized in the form of a dedicated new message (e.g., in the form of a dedicated MTRF charging message), the MTRF charging indicator may, of course, be omitted.

Moreover, it should be noted that the steps illustrated in FIG. 5 can also be performed in connection with a scenario different from the charging scenario discussed above. For example, the MSRN received by the GMSC 400 in step 650 may also be used for aggregating statistics. Such statics, may, for example, pertain to the number of calls handled by a specific MSC. Alternatively, or in addition, the MSRN received in step 650 may be used in connection with lawful interception in the home network of the called MS 450. In this regard, information about the location of the MS 450 may be provided.

In the following, the operation of the GMSC 400 and the old MSC 420 will be described in more detail with reference to the signalling diagrams of FIGS. 6 and 7. It will be appreciated that when referring to the old MSC 420 in this and other contexts, the VLR associated with the old MSC 420 can also be meant. Similar considerations apply with respect to the new MSC 430 and its associated VLR.

The signalling diagrams of FIGS. 6 and 7 will again be described in connection with implementing MTRF charging support in the GMSC 400. This means that the GMSC 400 upon receipt, from the old MSC 420, of the MSRN assigned by the new MSC 430 will add that MSRN in the charging record for the MTRF call. This will allow the network operator to use the GMSC charging record for charging the called MS 450 in connection with the MTRF call. As such, the network operator will no longer have to rely on the charging records of the visited new MSC 430 for charging the MS 450. It has again to be emphasized that the GMSC 400 could use the MSRN assigned by the new MSC 430 also for other purposes.

Figure 6:
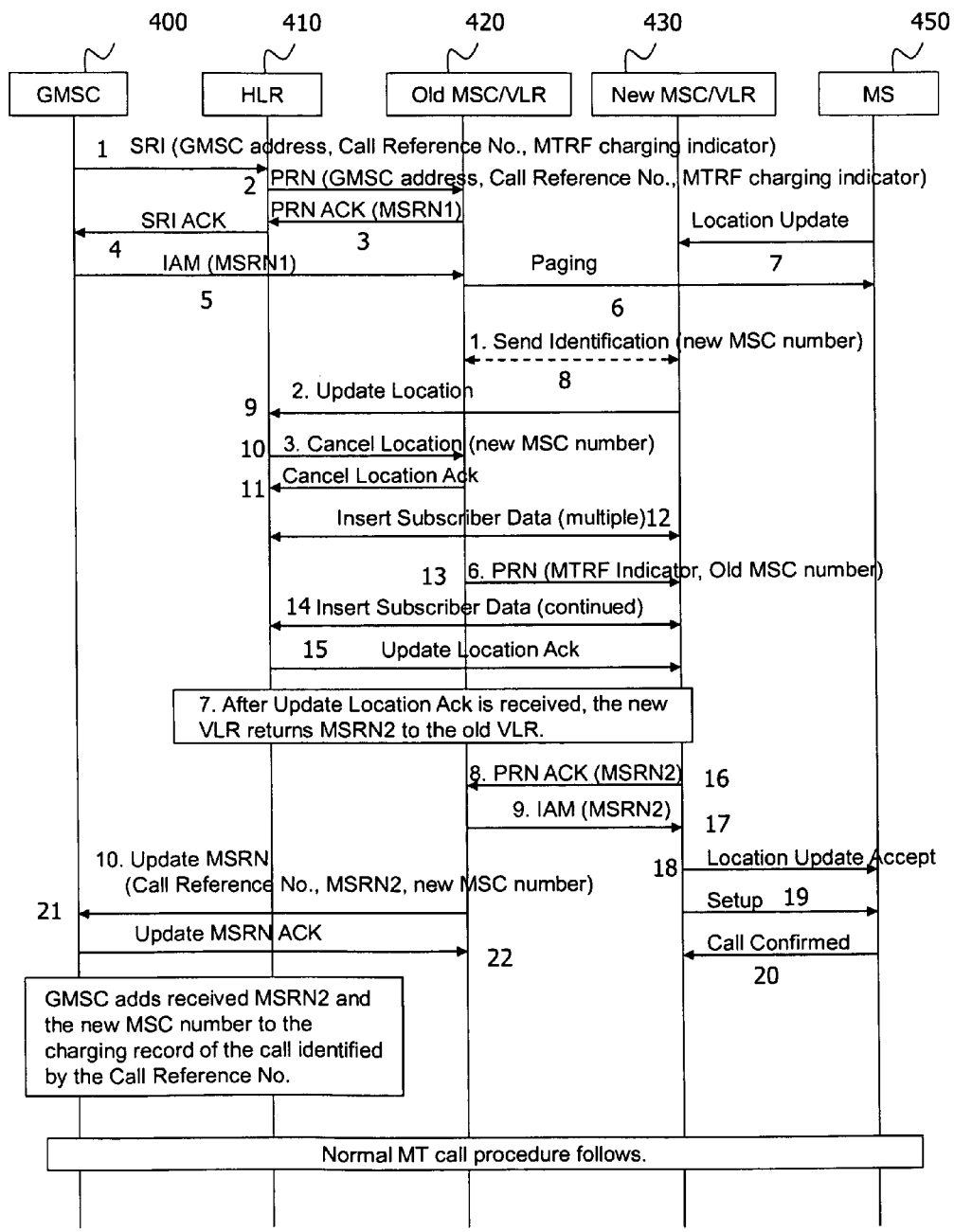
FIG. 6 illustrates a flow diagram representative of a method embodiment.

As illustrated in FIG. 6, signalling steps 1 to 6 generally correspond to the steps discussed above with reference to FIG. 1 and will therefore not be described in more detail. It is important, however, to note that in signalling step 1 the GMSC 400 indicates to the HLR 410 with a new MTRF charging indicator in the existing SRI message (that now forms the "information request message") that it supports the enhanced MTRF procedure presented herein and thus requests the MSRN assigned by the new MSC 430 (in the case of an MTRF procedure). The SRI message further comprises the address of the GMSC 400 as well as a call reference number associated with the terminating call to the MS 450.

The HLR 410 forwards, in signalling step 2, the MTRF charging indicator together with the GMSC address and the call reference number to the old MSC 420 in the existing PRN message (that now forms the "information request message). In one implementation, the forwarding of the MTRF charging indicator with the GMSC address and the call reference number from the HLR 410 to the old MSC 420 only occurs when the HLR 410 supports the enhanced MTRF procedure. Otherwise, a conventional PRN message without that specific content is send from the HLR 410 to the old MSC 420.

From the perspective of the GMSC 400, signalling step 1 corresponds to step 610 in FIG. 5, and from the perspective of the old MSC 420 signalling step 2 corresponds to step 620.

In signalling step 7 the MS 450 provides a Location Update message towards the new MSC 430. The Location Update message includes the old LA identifier, a TMSI/Network Resource Identifier (NRI) to the old MSC 420, and, in case of CSFB, a CSMT flag. The CSMT flag indicates to the new MSC 430 that the Location Update is due to a CSFB Mobile Terminating (MT) call.

In response to receipt of the Location Update message, the new MSC 430 initiates standard procedures for Location Update (see signaling steps 8 to 15 in FIG. 6). In connection with signalling step 8, the old MSC 420 receives the MSC number ("new" MSC number) associated with the new MSC 430 from the new MSC 430. The new MSC 430 derives the address of the old MSC 420 from the information received in signalling step 7 via the Location Update message from the MS 450.

When the old MSC 420 receives a Cancel Location message in signaling step 10, it stops its paging timer (that has been started earlier upon paging the MS 450 in connection with signaling step 6).

In signalling step 13, the old MSC 420 forwards the conventional MTRF indicator together with its own MSC number ("old" MSC number) to the new MSC 430. When the Update Location ACK message has been received in signalling step 15, the new MSC (VLR) 430 returns to the old MSC (VLR) 420 the MSRN assigned by the new MSC 430 to the MS 450 ("MSRN 2") in signalling step 16.

In a further signaling step 17, the old MSC 420 forwards the call set up request (e.g., IAM in ISUP or INVITE in SIP) together with MSRN2 to the new MSC 430. In response to receipt of the call set up request message in signaling step 17, the new MSC 430 continues the terminating call set up procedure. Specifically, the new MSC 430 handles the call set up to MS 450 by transmission of a SETUP message to the MS 450 in signaling step 18 and the receipt of a corresponding confirmation message in signaling step 19.

After the MTRF procedure has been invoked (see signalling step 13), and when the old MSC 420 has received MSRN2 assigned by the new MSC 430 in the PRN ACK message (signalling step 16), the old MSCN 420 will forward MSRN2 to the GMSC 400 in signalling step 21 (provided that the old MSC 420 has received the new MTRF charging indicator before in signalling step 2). In the embodiment of FIG. 6 MSRN2 as assigned by the new MSC 430 to the MS 450 is sent with a new MAP procedure in signalling step 21 called "Update MSRN" here. Signalling step 21 corresponds, from the perspective of the old MSC 420, to step 640 in FIG. 5, while the same signalling step, from the perspective of the GMSC 400, corresponds to step 650 in FIG. 5.

In the scenario illustrated in FIG. 6 MSRN 2 is forwarded to the GMSC 400 together with the call reference number as received by the old MSC 420 in signalling step 2 and the new MSC number as received by the old MSC 420 in signalling step 8. Receipt of the Update MSRN message is confirmed by the GMSC 400 with an Update MSRN ACK message in signalling step 22. The GMSC 400 then adds the received MSRN2 and, optionally, the new MSC number to the charging record of the call identified by the particular call reference number that has been returned by the old MSC 420 in signalling step 21.

The embodiment discussed above with reference to FIG. 6 uses a new MAP procedure based on the Update MSRN message to forward MSRN2 to the GMSC 400. The signalling diagram of FIG. 7 sketches an alternative solution in which MSRN2 is provided to the GMSC 400 by adding one or more new parameters to a backward message of the call setup procedure. The backward message may be an ACM messages if ISUP or BICC signalling is used between the GMSC 400 and the old MSC 420. In other realizations, MSRN2 (and, optionally, the new MSC number and/or the call reference number) may be added to another backward message, like an ANM, CON or CPG message. Moreover, if SIP is used between the GMSC 400 and the old MSC 420, a dedicated SIP header in a SIP response message could be used.

In the following discussion of the signalling diagram illustrated in FIG. 7, only the core differences to the signalling diagram discussed above with reference to FIG. 6 will be highlighted. Referring first to the SRI message in signalling step 1, the GMSC 400 again indicates to the HLR 410 with the new MTRF charging indicator that the GMSC 400 supports the enhanced MTRF procedure. In the present embodiment it is not necessary to add the GMSC address and/or the call reference number into the SRI message because in the call-related signalling based on ACM and similar messaging the GMSC 400 automatically knows to which ISUP/BICC call or to which SIP dialog a particular message belongs. Moreover, in the present embodiment and other embodiments even the MTRF charging indicator may be omitted, and the old MSC 420 may be configured to always send MSRN2 and/or the MSC number of the new MSC 430 in call-related backward signalling. Any GMSC 400 not supporting the enhanced MTRF procedure may simply discard that information. In such a scenario, the (regular) PRN message received in signalling step 2 from the HLR 410 will be considered by the old MSC 420 to constitute the information request message. In other implementations, the information request message may simply be omitted.

For the MAP-based solution in FIG. 6, on the other hand, the GMSC 400 may need to be addressed with the GMSC address, and the call may need to be identified with the call reference number (e.g., as described in 3GPP TS 29.002 in connection with the resume call handling procedure).

In signalling step 2 the MTRF charging indicator (if not omitted as explained above) is forwarded by the HLR 410 in the PRN message to the old MSC 420. Thus, the old MSC 420 is informed about the information requested by the GMSC 400. Once the old MSC 420 has received, after invoking the MTRF procedure, MSRN2 from the new MSC 430 in signalling step 16, and should the old MSC 420 have received the new MTRF charging indicator before, then the old MSC 420 will add MSRN2 to one of the backward messages that it sends to the GMSC 400 during the further call setup. It may also include the MSC number of the new MSC 430 into that (or another) backward message.

Figure 7:
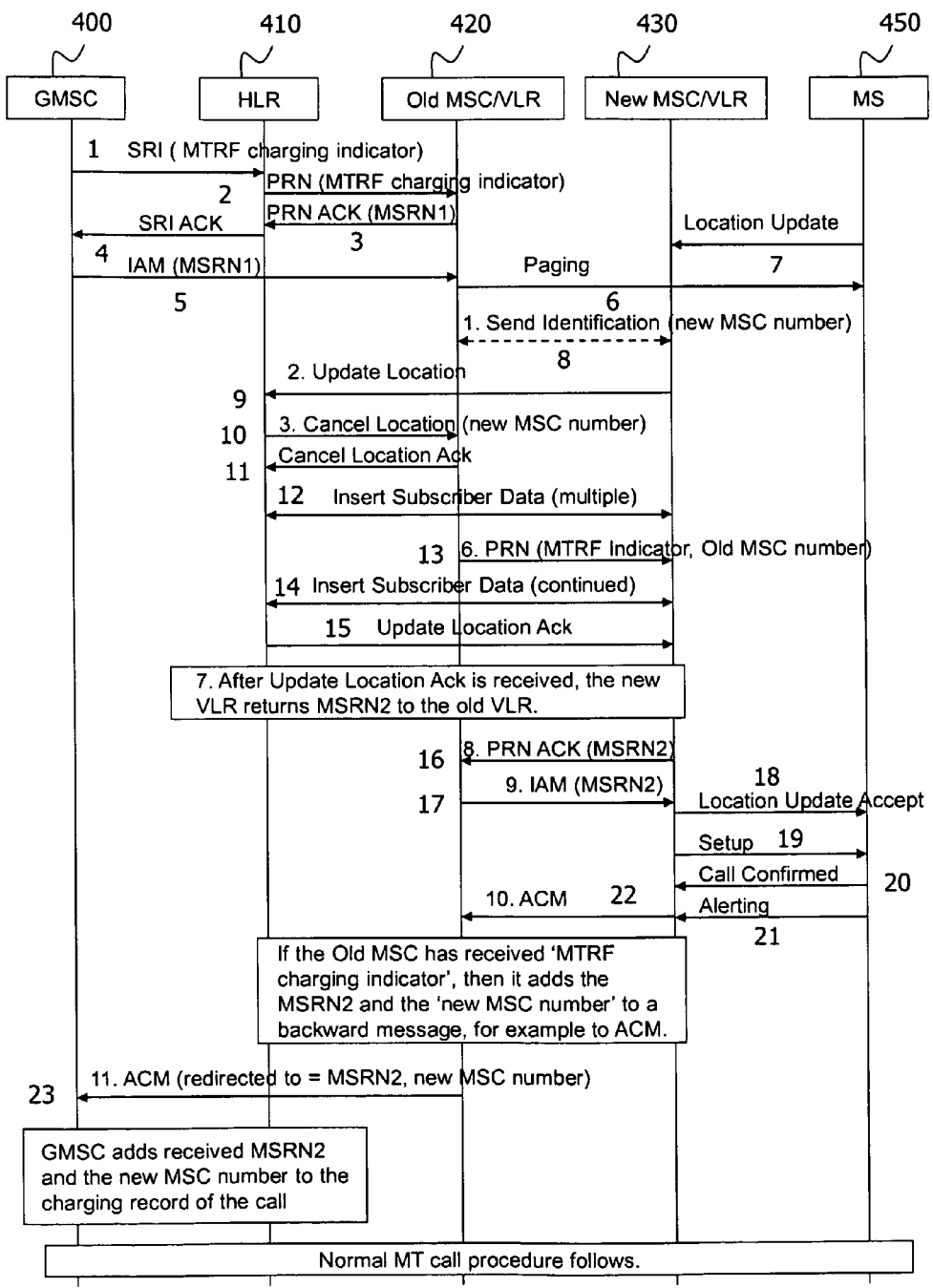
FIG. 7 illustrates another method embodiment in the form of a signalling diagram for an MTRF procedure.

In the embodiment illustrated in FIG. 7, the MS 450 sends an Alerting message in signalling step 21 to the new MSC 430, which triggers a corresponding ACM message 22 from the new MSC 430 to the old MSC 420. The old MSC 420 then adds MSRN2 as well as the new MSC number into the corresponding ACM backward message transmitted in signalling step 23 to the GMSC 400.

As discussed above, the backward message could in alternative embodiments be an ANM, CPG or CON message in case ISUP or BICC is used between the GMSC 400 and the old MSC 420. If SIP is used, the backward message could also be SIP Provisional Response or SIP Final Response message.

Once the GMSC 400 has received the ACM message with MSRN2 and the new MSC number, it adds MSRN2 and the new MSC number to the associated charging record as discussed above with reference to FIG. 6.

As has become apparent from the above description of exemplary embodiments, the technique presented herein enhances the processing capabilities of the GMSC 400. Specifically, the GMSC 400 can exploit the MSRN assigned by the new MSC 430 to the MS 450 for various purposes.

In one exemplary implementation, the technique presented herein allows network operators to keep their charging solution in the GMSC 400 for MTRF call scenarios. That is, charging control may be maintained in the GMSC 400 in scenarios where the visited PLMN changes during an MTRF call. Additionally, or in alternative realizations, the MSRN received by the GMSC 400 could also be used for other purposes, including collecting statistics and lawful interception.

The technique presented herein allows for a fast deployment of MTRF as an early roaming solution in Long Term Evolution (LTE) or other 4th Generation (4G) networks, optionally in connection with CSFB from E-UTRAN to GERAN or UTRAN. Of course, the technique presented herein may also be used in conventional roaming scenarios in GERAN or UTRAN without activation of CFSB.

It is believed that many advantages of the technique disclosed herein will be fully understood from the forgoing description, and it will be apparent that various changes may be made in the form, construction, and arrangement of the exemplary embodiments without departing from the scope of the invention, or without sacrificing all of its advantages. Because the technique presented herein can be varied in may ways, it will be recognized that the invention should be limited only by the scope of the claims that follow.

The invention claimed is:

1. A method of operating a first Mobile Switching Center, MSC, during a Mobile Terminating Roaming Forwarding, MTRF, procedure for a call to a Mobile Subscriber, MS, the MTRF procedure involving the first MSC paging the MS and a second MSC where the MS is performing a location update, the method comprising:
   receiving an information request message;
   receiving, from the second MSC, a Mobile Subscriber Roaming Number, MSRN, associated with the call to the MS; and
   sending, in response to the information request message, the MSRN towards a Gateway MSC, GMSC.

2. The method of claim 1,
   wherein the information request message is generated by the GMSC or a Home Location Register, HLR.

3. The method of claim 1,
   wherein the information request message is received from a Home Location Register, HLR.

4. The method of claim 1,
   wherein the information request message comprises an information request indicator.

5. The method of claim 1,
   further comprising sending, towards the GMSC, an MSC number associated with the second MSC.

6. The method of claim 5,
   further comprising receiving, from the second MSC, the MSC number to be sent towards the GMSC.

7. The method of claim 1,
   wherein the MSRN is sent towards the GMSC in one of an Address Complete Message (ACM), Answer Message (ANM), Connect (CON) message, Call Progress (CPG) message, Session Initiation Protocol, SIP, Provisional Response and SIP Final Response message.

8. The method of claim 1,
   wherein the MSRN is sent towards the GMSC in a dedicated Mobile Application Part, MAP, procedure.

9. The method of claim 1,
wherein the information request message comprises at least one of an address of the GMSC and a call reference number.

10. The method of claim 9,
further comprising sending the call reference number towards the GMSC.

11. A method of operating a Gateway Mobile Switching Center, GMSC, during a Mobile Terminating Roaming Forwarding, MTRF, procedure for a Mobile Subscriber, MS, the MTRF procedure involving a first MSC paging the MS and a second MSC where the MS is performing a location update, the method comprising:
sending an information request message towards the first MSC; and
receiving, from the first MSC and in response to the information request message, a Mobile Subscriber Roaming Number, MSRN, assigned by the second MSC and associated with the call to the MS.

12. The method of claim 11,
further comprising adding the MSRN to a call record.

13. The method of claim 12,
wherein the information request messages comprises an MTRF charging indicator and wherein the MSRN is added to a charging record of the call.

14. The method of claim 12,
further comprising receiving an MSC number associated with the second MSC, and adding the MSC number to the call record.

15. The method of claim 11,
wherein the MSRN is used in connection with compiling statistics.

16. The method of claim 11,
wherein the MSRN is used for in connection with lawful interception.

17. The method of claim 11,
wherein the information request message is sent towards a Home Location Register, HLR, for being forwarded towards the first MSC.

18. The method of claim 11,
wherein the information request message comprises at least one of an address of the GMSC and a call reference number.

19. The method of claim 18,
wherein the MSRN is received together with the call reference number and wherein the MSRN is added to the call record identified by the call reference number.

20. A computer program product comprising a non-transitory computer readable medium storing program code that performs the steps of claim 1 when the program code is executed by one or more computing devices.

21. A Mobile Switching Center, MSC, for participating in a Mobile Terminating Roaming Forwarding, MTRF, procedure for a call to a Mobile Subscriber, MS, the MTRF procedure involving the MSC paging the MS and another MSC where the MS is performing a location update, the MSC comprising:
a first interface adapted to receive an information request message;
a second interface adapted to receive, from the second MSC, a Mobile Subscriber Roaming Number, MSRN, associated with the call to the MS; and
a third interface adapted to send, in response to the information request message, the MSRN towards a Gateway MSC, GMSC.

22. A Gateway Mobile Switching Center, GMSC, for participating in a Mobile Terminating Roaming Forwarding, MTRF, procedure for a call to a Mobile Subscriber MS, the MTRF procedure involving a first MSC paging the MS and a second MSC where the MS is performing a location update, the GMSC comprising:
a first interface adapted to send an information request message towards the first MSC; and
a second interface adapted to receive, from the first MSC and in response to the information request message, a Mobile Subscriber Roaming Number, MSRN, assigned by the second MSC and associated with the call to the MS.

* * * * *